M. A. YEAKLEY.
ANTIFRICTION BEARING.
APPLICATION FILED JAN. 7, 1915.
1,293,605.
Patented Feb. 4, 1919.
4 SHEETS—SHEET 1.
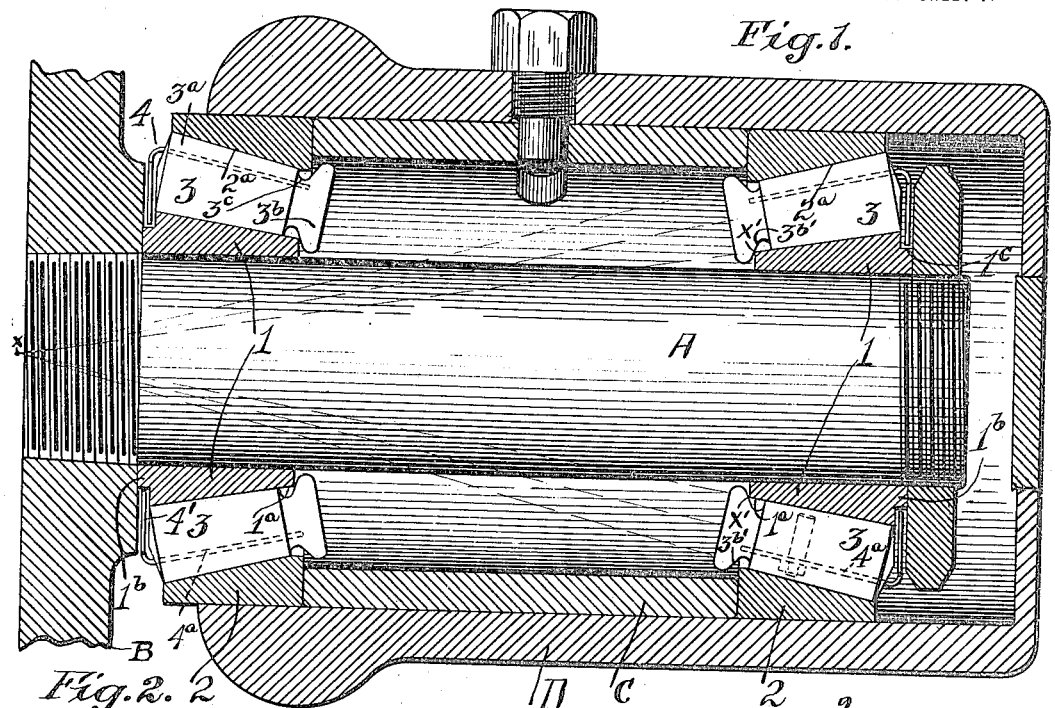
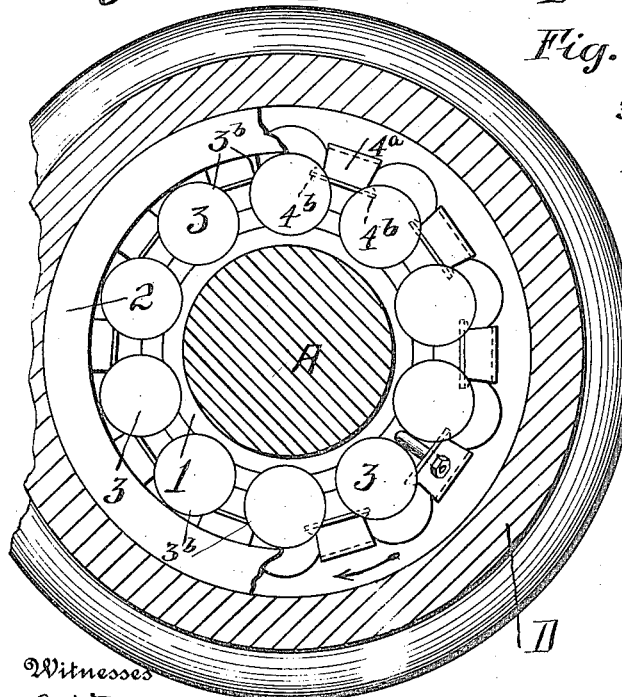
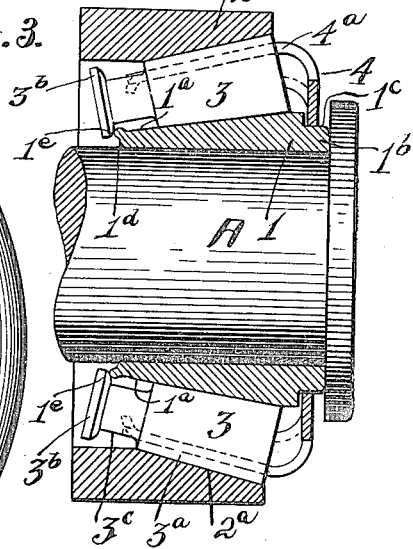
Witnesses
S. W. Brainard.
W. H. Percy.
Inventor
Melvin A. Yeakley,
By Edward R. Alexander,
Attorney

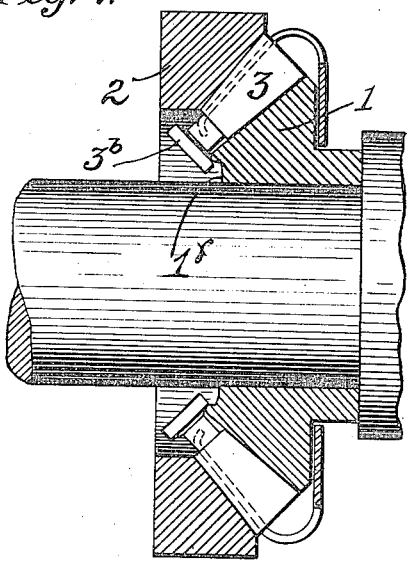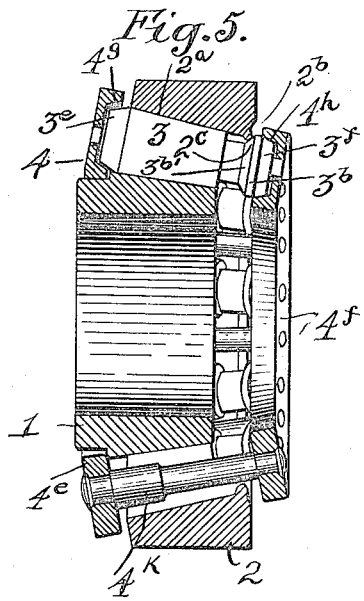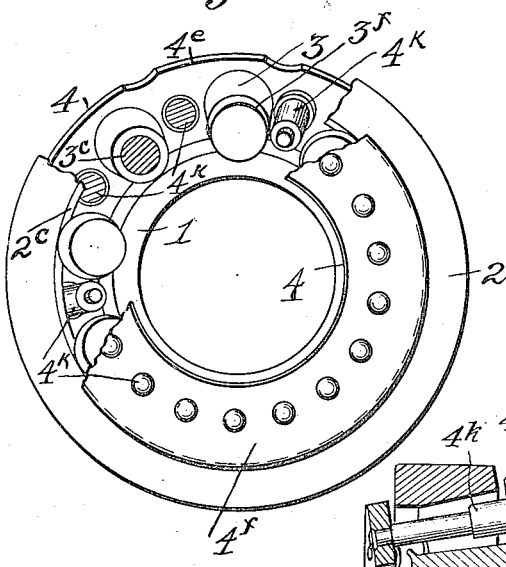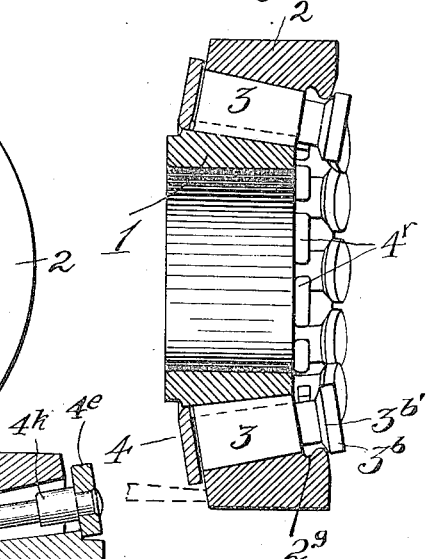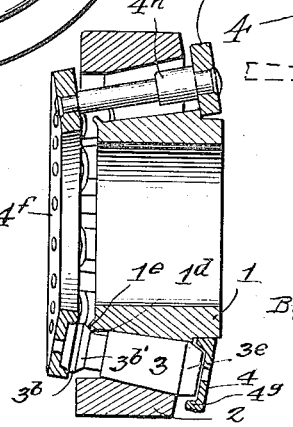

M. A. YEAKLEY.
ANTIFRICTION BEARING.
APPLICATION FILED JAN. 7, 1915.
1,293,605.
Patented Feb. 4, 1919.
4 SHEETS—SHEET 3.
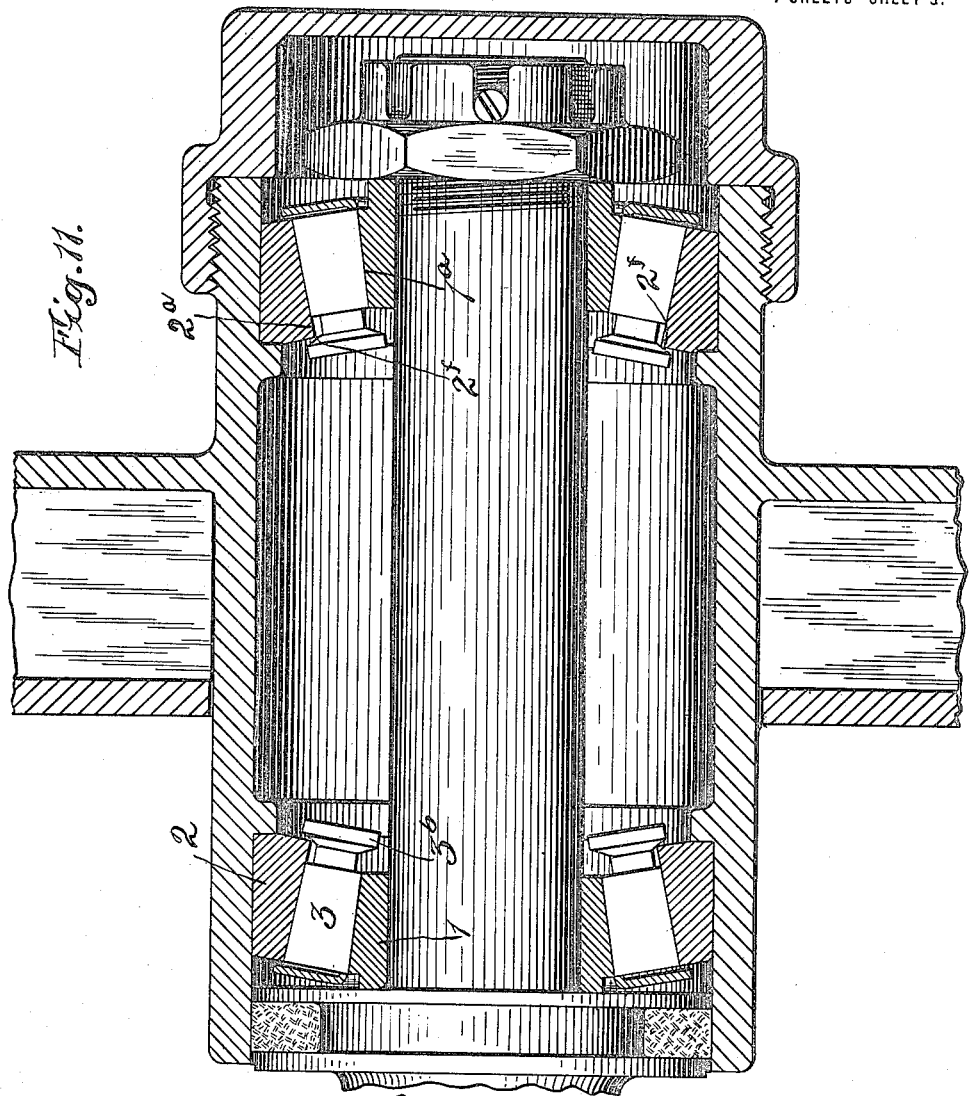
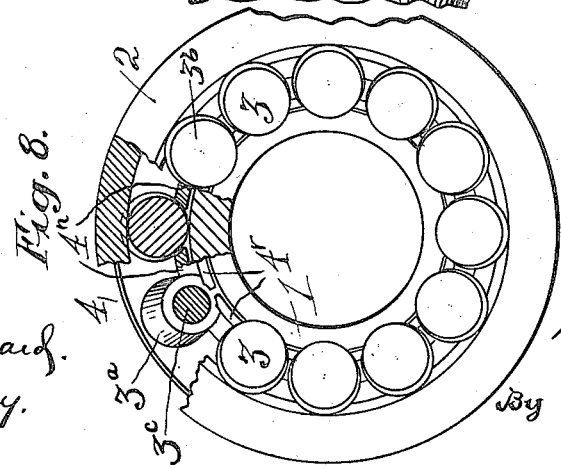
Witnesses
S. W. Brainard.
W. H. Percy.
Inventor
Melvin A. Yeakley,
By Edward A. Alexander
Attorney

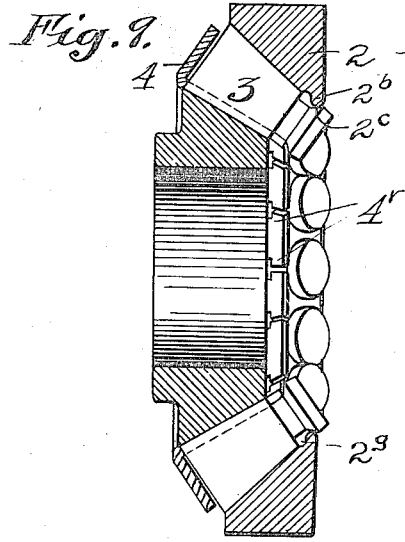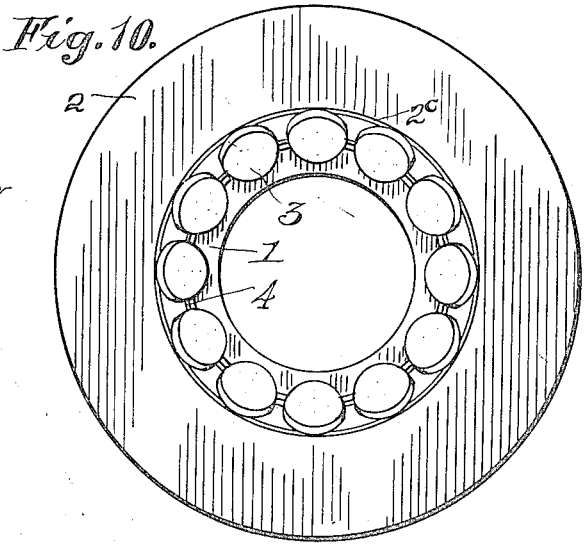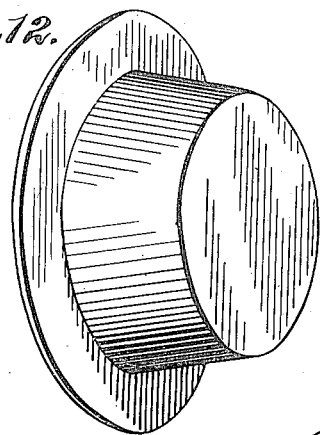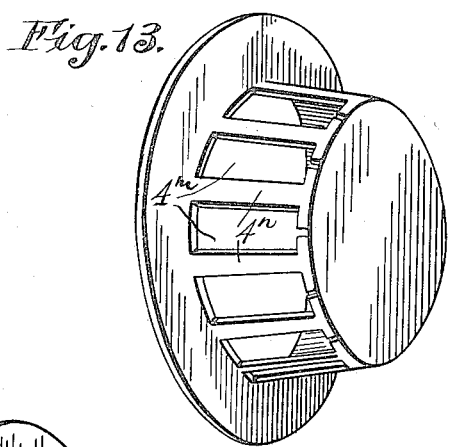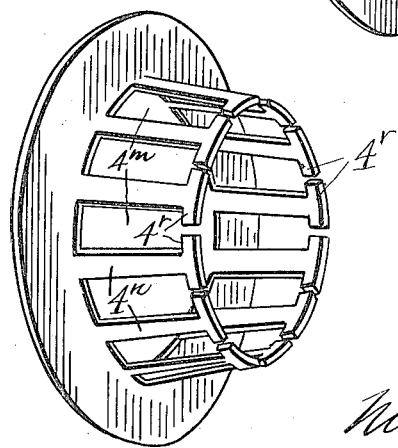

UNITED STATES PATENT OFFICE.

MELVIN A. YEAKLEY, OF CANTON, OHIO.

ANTIFRICTION-BEARING.

1,293,605.   Specification of Letters Patent.   Patented Feb. 4, 1919.

Application filed January 7, 1915. Serial No. 1,025.

*To all whom it may concern:*

Be it known that I, MELVIN A. YEAKLEY, a citizen of the United States, residing at Canton, in the county of Stark and State of Ohio, have invented certain new and useful Improvements in and relating to Antifriction-Bearings, of which the following is a specification.

This invention relates to improvements in anti-friction bearings more particularly of the type in which rollers, as contradistinguished from balls, are used.

The object of my invention has been to simplify the construction of bearings of this type and reduce their cost, and at the same time provide a correlation of the elements which will insure more efficient operation and greater durability of the bearing as an entirety.

For the purpose of illustration I have herein disclosed and described several roller bearing constructions embodying my invention.

Figure 1 is a longitudinal elevation of a hub construction fitted with anti-friction bearings embodying my improvements.

Fig. 2 is a transverse section through the construction illustrated in Fig. 1.

Fig. 3 is a longitudinal section of a modified construction of anti-friction bearing embodying my improvements.

Fig. 4 is a longitudinal section of another modified construction of anti-friction bearing embodying my improvements.

Fig. 5 is a longitudinal section of another modified construction of anti-friction bearing embodying my improvements.

Fig. 6 is a view partly in end elevation and partly in section of the bearing shown in Fig. 5.

Fig. 7 is a longitudinal section of another modified construction of anti-friction bearing embodying my improvements.

Fig. 8 is a view partly in end elevation and partly in section of the bearing shown in Fig. 7.

Fig. 9 is a longitudinal section of another modified construction of anti-friction bearing embodying my improvements.

Fig. 10 is an end elevation of the bearing shown in Fig. 9.

Fig. 11 illustrates a wheel hub provided with anti-friction bearings embodying my improvements.

Figs. 12, 13 and 14 are perspective views of a bearing cage embodying my improvements in process of construction.

Fig. 15 is a longitudinal section of another modified construction of anti-friction bearing embodying my improvements.

In Figs. 1 and 2, I have shown a couple of bearings embodying my improvements in a section of a portion of the trolley base. These bearings are mounted on a stud shaft A which, at its lower end, is fitted into a supporting plate B. The bearings are spaced apart by a spacing ring C and serve to support the hub D of a trolley pole carrier.

1 indicates a cone, 2 a race member and 3 the rollers interposed between the cone and race member. The taper of the conical bearing surfaces of the cone, race member and rollers may be of any suitable degree. In Fig. 1 the point $x$ is the apex of the cone, or diminishing point, through which the lines of the conical surfaces of the race member, rollers and cone of the bearing in section extend. The conical surface $1^a$ of the cone is uninterrupted from end to end so that it may be readily and cheaply ground to accurate dimensions. At its large end the material of the cone has a laterally extended cylindrical section $1^b$ and a shoulder $1^c$ for purposes to be hereinafter described.

The conical surface $2^a$ of the race member is likewise uninterrupted from end to end so that it may also be cheaply and quickly ground to accurate dimensions, there being no flanges or extensions of any nature on the conical surfaces of either the cone or race member to interfere with simple grinding operations thereof.

Each of the rollers consists of a main section $3^a$ suitably tapered from end to end to coöperate with the surfaces $1^a$ of the cone and $2^a$ of the race member, a flange $3^b$, preferably at the end of the roller which is smallest in diameter, and a recessed section $3^c$ connecting the portions $3^a$ and $3^b$. This construction of roller enables simple, accurate and cheap grinding of the section $3^a$ to the desired size.

The flange $3^b$ is of sufficient diameter to be intersected by the line of the surface of the cone, as indicated at $x'$ and the inner surface of the flange is so shaped as to insure substantially a point contact between the end of the cone with which it engages or may engage, and the flange in line with the conical surface $1^a$ of the cone. In other words, the area of contact between the flange surface $3^{b'}$ of the flange and the cone is relatively so small and the point of engagement between these coöperating elements is so shaped that the roller may be considered to have substantially a line contact with the cone in the line of the conical surface of the cone, so that as these parts move relative to each other, or as the roller rotates on the cone, there will be substantially no slippage between any of their contacting surfaces.

Any suitable cage for separating and positioning the rollers may be employed. I have indicated one at 4 which comprises a plate $4'$ fitted over the extension $1^b$ of the cone and limited in its movement toward the smaller end of the cone by the cone shoulder $1^c$, and a plurality of fingers $4^a$, each interposed between rolls of an adjoining pair. At their free ends these fingers may be laterally extended to enter the recesses in the adjacent rollers as indicated at $4^b$. The cage may be built of sheet metal, so as to possess any desired degree of resiliency of its parts.

In Fig. 3 I have illustrated a modification of the bearing shown in Figs. 1 and 2. This consists in forming a thrust flange $1^d$ at the smaller end of the cone and in shaping the surface $1^e$ of this thrust flange, so that it will have point contact with the roller flange $3^b$ in the line of the cone surface $1^a$ extended. With this modified form of construction, as illustrated in Fig. 3, it is perhaps possible to take the roller end thrust between the roller flange $3^b$ and the cone flange $1^e$ exactly in the line of the cone surface $1^a$ extended, or at any rate, more closely approximate point contact between the roller flange and the cone than with the construction shown in Figs. 1 and 2.

In Fig. 4, still another modification is shown, wherein, owing to the cone rolling surface angle, I have recessed the cone as indicated at $1^f$, in order to obtain the desired point of contact between the roller flange $3^b$ and the smaller end of the cone.

Each of the bearing constructions embodying my invention above described has included the idea of taking the roller thrust between adjacent ends of the cone and roller. My invention also contemplates the taking of this thrust between the adjacent ends of the roller and race member as disclosed in Figs. 5 to 11, inclusive.

In Figs. 5 and 6, a well fitted cage 4 is shown supporting the rollers at opposite ends. The large end of each roller is shown to be tapered as indicated at $3^e$ and the roller flange $3^b$ at the smaller end of the roller is shown to be tapered as indicated at $3^f$. The end pieces $4^e$, $4^f$, of the cage have tapered recesses $4^g$, $4^h$, respectively, to receive the adjacent tapered ends of the rollers. These end plates are held properly spaced by posts $4^k$. Supporting the rollers near their extreme ends is preferable to supporting or guiding them from intermediate points. It will be noted that in order to guide the cone flange in a recess of the adjacent end plate of the cage, it is necessary for both the recess and the cone flange to be tapered, otherwise, the parts could not be properly assembled. The tapered ends $3^e$ and $3^f$ of a roller may be used for holding the roller in cup centers during the grinding of the roller, obviating the necessity of centering each roller from a point at its axis. The cage will touch nothing but the ends of the roller and will hold the roller with the race member, the cone being freely removable.

In the bearings shown in Figs. 5 and 6, the race member 2 has a flange $2^b$ with a bearing surface $2^c$ arranged to make substantially point contact with the surface $3^{b'}$ of a roller in the line of the conical race surface $2^a$.

In Figs. 7 and 8, a different type of cage 4 is shown. This is a sheet metal cage which may be developed by forming a piece of sheet metal in cup shape, as illustrated in Fig. 12, then punching out sections $4^m$ to form spacing bars $4^n$ for the rollers having separating fingers $4^v$, as indicated in Fig. 13, and then punching out the bottom of the cup so as to leave each spacing bar and its finger 3 free at the finger end, as shown in Fig. 14. The metal stock used may be sufficiently resilient to permit each spacing bar to spring and bend enough to introduce the rollers when assembling, without taking any set. This cage is formed to hold the rollers closely to the race member and to permit the free removal of the cone.

The race member 2 is shown to be grooved at $2^g$ adjacent the thrust flange $2^b$ thereon, so as to facilitate grinding of the conical surface $2^a$ of the race member.

The bearing shown in Figs. 9 and 10 is substantially the same as the bearing shown in Figs. 7 and 8 with the exception that the angle of the rolling surface of the cone is greater. This bearing is more suitable for use where the end thrusts are greater than the side thrusts. A pair of these bearings will take the thrust and load in any direction, this construction of bearing for example being particularly suitable for mounting worm gearing.

In Fig. 11 I have shown a wheel hub and axle spindle fitted with bearings embodying my invention. These bearings differ from those illustrated in Figs. 5 to 10, inclusive, principally in the fact that the race members are not provided with thrust flanges. The conical surfaces $1^a$ of the cones and $2^a$ of the race member are ground through from end to end on straight lines, and the end thrust of the rollers is taken on one end of the race member, substantially in line with the conical surface of the race member, between the roller flange and the adjacent bearing edge 2<sup>t</sup> of the race. It will be noted that with each of the bearing constructions embodying my improvements, above described, a roller flange at one end of the roller only is shaped and disposed to engage with and coöperate with an adjacent bearing surface either of the cone or race member and to take thrust in the line of the conical surface of that element of the bearing, either the cone or race member, with which said roller engages.

The end thrust of the roller is preferably taken on a flange at the smaller end of the roller and in line with the conical surface of the bearing element with which that flange has contact. The large end of the roller is substantially free, that is, it does not have end thrust engagement with any part either of the cone or race member. Its position is controlled by the centering flange at the small end of the roller, the engagement of this flange with the adjacent surface of one of the conical elements of the bearing, either cone or race member, serving to maintain the roller with its axis in the proper line. For example, with the race member rotating in the directions shown by the arrow in Fig. 2, any tendency of the larger end of the roller to lag behind is overcome by the frictional resistance of the flange on the roller tending to rock upon the surface of the conical element with which it engages. Each roller is, so to speak, suspended from its smaller end and the mass in the roller tends to center the roller with its axis in the proper rolling line with reference to the cone and race member. Again, if the larger end of a roller should be crowded ahead in any manner, the friction at the point of contact between the roller flange and the element with which it engages is relieved, and this allows the smaller end to roll freely and overtake the larger end, so as to properly aline and position the roller. On the other hand, if the smaller end is crowded ahead for any reason, the friction between the flange thereat, and the coöperating part of the bearing with which engages tends to hold the smaller end back while the larger end catches up.

By putting the thrust on the smaller end only, the tendency of the smaller end under normal operations to run ahead is overcome and the larger end does not run ahead because of its tendency under load to slip out from between the conical surface of the bearing.

In rolling on the outside bearing element or race member, as disclosed in Figs. 5 to 11, inclusive, instead of on the inside bearing element or cone, as disclosed in Figs. 1 to 4, inclusive, the friction on the roller flange is somewhat reduced in view of the fact that rotative motion of both of the engaging elements is taking place in the same general direction, although not about the same axis.

Each of the types of cages illustrated in Figs. 5 to 11, inclusive, serves to hold the rollers with the race member, so that the cone may be freely removed.

It will be noted that when the race member, in any of the constructions shown in Figs. 5 to 11, inclusive, is subjected to end thrust upon its end with which the roller flanges engage, the tendency of the race member is to move away from the roller flanges at the smaller ends of the rollers, thereby relieving pressure between the roller flanges and the race member, and practically throwing all of the thrust in the first instance onto the body of the roller and thence to the cone. In other words, with this type of construction embodying my improvements, the roller flange is substantially relieved from sudden and heavy end thrusts which will tend to shear off the metal of the flange, and the flange when it is called upon to take any end thrust merely takes that due to the tendency of the roller to move out between the cone and the race member at the larger ends thereof.

To those skilled in the art of making mechanism of the class described, many alterations in construction and widely differing embodiments and applications of my invention will suggest themselves, without departing from the spirit and scope thereof. My disclosures and the descriptions herein are purely illustrative and are not intended to be in any sense limiting.

What I claim is:

A taper roller bearing comprising two concentric elements, one a race member and the other a cone, and a plurality of tapered rollers interposed between said race member and cone, each roller having a single thrust flange which overlaps one end of one of said bearing elements and makes on its inner surface substantially a point contact with the said element which it overlaps in the line of the conical surface of said element, and takes at said inner surface the roller end thrust.

2. A taper roller bearing comprising two concentric elements, one a race member and the other a cone, and a plurality of tapered rollers interposed between said race member and said cone, each roller having a thrust flange arranged to make on its inner surface substantially a point contact with an adjacent surface of one of said elements in the line of the conical surface of said element, and takes at said inner surface the roller end thrust.

3. A taper roller bearing comprising two concentric elements, one a race member and the other a cone, and a plurality of taper rollers, one of said concentric bearing elements having at one end a radially projecting thrust flange, and each of said rollers having at one end a radially projecting thrust flange arranged to overlap the said flange on said bearing element and to make point contact on its inner surface in the line of the conical surface thereof and to take the roller end thrust thereat with the outer surface of said flange on said bearing element.

4. A taper roller bearing comprising two concentric elements, one a race member and the other a cone, and a plurality of tapered rollers interposed between said race member and said cone, each of said rollers having at its smaller end a thrust flange, and one of said bearing elements having a thrust flange, the outer surface of which has point contact with the said flange of said roller in the line of the conical surface of said element.

5. A taper roller bearing comprising two concentric elements, one a race member and the other a cone, and a plurality of tapered rollers interposed between said race member and said cone, said cone having at its end of smallest diameter a radially extending thrust flange, and each roller having a radially extending thrust flange overlapping said thrust flange of the cone and making point contact therewith in the line of the conical surface of the cone.

6. A taper roller bearing comprising two concentric elements, one a race member and the other a cone, and a plurality of tapered rollers interposed between said race member and said cone, said cone having a radially extending thrust flange, and each roller having a radially extending thrust flange overlapping said thrust flange of the cone and making on its inner surface point contact therewith in the line of the conical surface of the cone, and taking the roller end thrust thereat.

7. A taper roller bearing comprising a cone, a race member, and a plurality of rollers, each roller having a flange with a conical surface, and a cage having an end wall with conical recesses, each arranged to receive one of said conical flanges on a roller.

8. A taper roller bearing comprising a cone, a race member, and a plurality of rollers interposed between said cone and race member, each roller being oppositely tapered at opposite ends, and a cage having end walls with corresponding conical recesses, each of said recesses arranged to receive the adjacent tapered end of a roller.

9. A taper roller bearing comprising two concentric elements, one a race member and the other a cone, a plurality of taper rollers interposed between said race member and said cone, and a cage for said rollers, said cone having at one end a radially extending thrust flange and each of said rollers having a radially extending thrust flange, the adjacent overlapping surface of said thrust flanges of the rollers and cone making point contact in the line of the conical surface of the cone.

10. A roller bearing having a cone with a flange at its smaller end projecting radially beyond the conical surface of the cone, and a plurality of tapering rollers, each extended over said flange and having a recessed portion to clear the projecting portion of said flange, and having adjacent such recessed portion a flange making on its inner surface point contact with said cone flange in the line of the conical surface of the cone.

11. In a roller bearing, the combination of a plurality of tapering rollers and a cone having overlapping flanges provided with opposed, slightly divergent, non-parallel end thrust surfaces contacting in a point which is the projection of the line of contact between the rollers and the cone, said non-parallel surfaces both extending upon opposite sides of said point of contact, whereby the thrust between the contacting elements is from the inner surfaces of said roller flanges against the cone in the direction of the large end thereof.

In testimony whereof I affix my signature, in the presence of two witnesses.

MELVIN A. YEAKLEY.

Witnesses:
W. H. CATHCART,
EDWARD R. ALEXANDER.

It is hereby certified that in Letters Patent No. 1,293,605, granted February 4, 1919, upon the application of Melvin A. Yeakley, of Canton, Ohio, for an improvement in "Antifriction-Bearings," an error appears in the printed specification requiring correction as follows: Page 4, line 4, claim 3, after the word "surface" insert the words *with the outer surface of said flange on said bearing element;* and that the said Letters Patent should be read with this correction therein that the same may conform to the record of the case in the Patent Office.

Signed and sealed this 8th day of April, A. D., 1919.

[SEAL.]

F. W. H. CLAY,
*Acting Commissioner of Patents.*

Cl. 64—62.